(12) United States Patent
Chen

(10) Patent No.: US 6,844,687 B1
(45) Date of Patent: Jan. 18, 2005

(54) METHOD OF OPERATING A DISCHARGE LAMP

(75) Inventor: Nancy H. Chen, Salem, MA (US)

(73) Assignee: Osram Sylvania Inc., Danvers, MA (US)

(*) Notice: Subject to any disclaimer, the term of this patent is extended or adjusted under 35 U.S.C. 154(b) by 0 days.

(21) Appl. No.: 10/672,630

(22) Filed: Sep. 26, 2003

(51) Int. Cl.[7] .............................................. H05B 37/00
(52) U.S. Cl. ..................... 315/246; 315/174; 315/DIG. 5
(58) Field of Search ................................. 315/246, 174, 315/209 R, DIG. 5, DIG. 7

(56) References Cited

U.S. PATENT DOCUMENTS

| 4,373,146 A | * | 2/1983 | Bonazoli et al. | ......... 315/209 R |
| 5,134,345 A | * | 7/1992 | El-Hamamsy et al. | ...... 315/248 |
| 6,124,683 A | | 9/2000 | Olsen et al. | ................. 315/291 |
| 6,184,633 B1 | | 2/2001 | Kramer | ....................... 315/246 |
| 6,437,517 B1 | | 8/2002 | Kramer | ....................... 315/246 |

OTHER PUBLICATIONS

J. Olsen and W.P. Moskowitz, *Optical Measurement of Acoustic Resonance Frequencies in HID Lamps*, Proceedings of the IEEE Industrial Applications Society Annual Meeting, New Orleans, LA (Oct. 1997).

* cited by examiner

*Primary Examiner*—David Vu
(74) *Attorney, Agent, or Firm*—Robert F. Clark

(57) ABSTRACT

A method of operating a discharge lamp includes modulation of lamp power with a first longitudinal mode frequency to reduce segregation of the vapor phase species within the arc tube. The first longitudinal mode excitation frequency is determined by the acoustic response spectrum observed at an upper region of the arc tube when operated vertically. A frequency in an arc-straightening frequency range may also be added to the input power to straighten and center the arc.

21 Claims, 2 Drawing Sheets

METHOD OF OPERATING A DISCHARGE LAMP

BACKGROUND OF THE INVENTION

The present invention is directed to a method of operating a discharge lamp that reduces segregation in the arc discharge tube.

Operation of an arc discharge tube with its axis other than horizontal can lead to segregation of vapor phase species, which in turn leads to color separation over the length of the arc tube, reduced light output, local overheating of the arc tube wall, and other problems that may cause premature lamp failure or unsatisfactory lamp performance. This is particularly true for lamps having high aspect ratio arc tubes (arc tubes whose length-to-width ratio is >about 2).

Acoustic modulation of the input lamp power has been proposed as a solution to the segregation problem. For example, U.S. Pat. No. 6,124,683 describes an arc discharge lamp in which the arc is straightened by acoustic modulation of the lamp power resulting in improved efficacy and a reduced asymmetry of the color. The acoustic modes of discharge lamps are known to those of skill in the art, and the following is a brief summary of what is known. Modulation of lamp power causes modulation of the arc temperature distribution and, as a result, modulation of the gas pressure distribution throughout the arc discharge tube of the lamp. Certain frequencies of modulation cause standing wave oscillation of the gas pressure in the tube. Because of the cylindrical shape of commercial arc discharge tubes, the acoustic modes can generally be described as modes of a cylinder of a size comparable to the discharge, or inner, cavity (i.e., the cavity in which the arc is formed) in the arc tube of the lamp. If the pressure has a spatial dependence along the axis of the tube (i.e., the cylinder of comparable size), then the mode is longitudinal with the number of half-wavelengths in the standing wave determining the order of the mode. For example, if there are two half-wavelengths, the mode is the second longitudinal mode. If the pressure has a spatial dependence along the radius of the tube, then the mode is radial, and if the pressure has a spatial dependence around the circumference of the tube, then the mode is azimuthal. Combination acoustic modes are also possible, such as radial-longitudinal modes and azimuthal-longitudinal modes, in which the pressure distribution varies along more than one coordinate. These combination modes can be further defined, depending on the periodicity of the standing wave, such as a combination acoustic mode of the third azimuthal and second longitudinal modes.

The resonance frequencies for each of these acoustic modes are determined by the dimensions of the discharge cavity of the arc tube and the speed of sound in the gas phase in the discharge cavity. In a first approximation, the speed of sound depends on the arc temperature and the composition of the gas phase in the discharge cavity. More particularly, the speed of sound is proportional to $(T/m)^{1/2}$ where T is the temperature and m is the average molecular mass of the various vapor phases constituents. In arc tubes having a high Xe gas fill pressure, m is approximately the mass of Xe. Although the arc temperature in an operating arc tube is location dependent, the resonance frequencies nevertheless may be reasonably estimated using an isothermal cylindrical model.

The longitudinal mode (nL) frequencies are roughly $$f_{nL} = (n^*C)/(2^*\text{Length}),$$

where $f_{nL}$ is the nth longitudinal mode, C is the average speed of sound in the gas phase, and Length is the cavity length.

The radial mode (nR) frequencies are roughly $$f_{nR} = (k_{nR}^*C)/(\pi^*D)$$

where $f_{nR}$ is the nth radial mode, $k_{nR}$ is a constant that is known for each radial mode (it is 3.83 for the first radial mode and higher for subsequent modes), C is the average speed of sound in the gas phase, and D is the diameter of the cavity.

The azimuthal mode (nA) frequencies are roughly $$f_{nA} = (k_{nA}^*C)/(\pi^*D)$$

where $f_{nA}$ is the nth azimuthal mode, $k_{nA}$ is a constant that is known for each azimuthal mode (it is 1.84 for the first azimuthal mode, 3.05 for the second, 4.20 for the third and higher for subsequent modes), C is the average speed of sound in the gas phase, and D is the diameter of the cavity.

Better estimates of the resonance frequencies can be obtained from finite element calculations of the eigenmodes of vessels approximating the shape of the cavity in which the arc is formed using well estimated temperature and composition distributions.

For some combination modes the frequencies can be determined by combining the frequencies of the individual modes in quadrature. For example, the resonance frequency of the first radial (1R) and fourth longitudinal (4L) combination mode is:

$$f_{1RAL}^2 = f_{1R}^2 = f_{4L}^2.$$

These frequencies are the power modulation frequencies (denoted herein "power frequencies"). The corresponding voltage (or current) frequencies depend on the type of waveform being applied. For sine waves, the corresponding current (or voltage) frequencies are one-half the power frequencies.

With reference again to the prior art, a further solution to the problem of vertical segregation is offered in U.S. Pat. No. 6,184,633 that suggests that amplitude modulation of an arc-straightening frequency sweep may be effective. For example, a (current) frequency sweep from 45 kHz to 55 kHz every ten milliseconds in a saw tooth pattern may be amplitude modulated at a frequency corresponding to the second longitudinal acoustic mode and a modulation index of 0.24. The modulation index is defined as (Vmax−Vmin)/(Vmax+Vmin), where Vmax is the maximum peak-to-peak voltage of the amplitude modulated envelope and Vmin is the minimum peak-to-peak voltage of the amplitude modulated envelope. This reference points out that amplitude modulation at a frequency corresponding to the first longitudinal acoustic mode is less effective than the preferred frequency corresponding to the second longitudinal acoustic mode, although vertical segregation is reduced somewhat with amplitude modulation at the frequency corresponding to the first longitudinal acoustic mode.

SUMMARY OF THE INVENTION

An object of the present invention is to provide a novel method of operating a discharge lamp that reduces segregation of vapor phase species during operation of the discharge lamp, especially when the arc discharge tube axis is other than horizontal and the arc discharge tube has a high aspect ratio.

It is a further object of the invention to modulate the input power of a discharge lamp in such a way as to excite a first longitudinal resonance mode whereby segregation in the arc discharge tube is reduced.

In accordance with one object of the invention, there is provided a method of operating a discharge lamp, the discharge lamp having an arc discharge tube having a substantially cylindrical inner cavity, the arc discharge tube when operated in a vertical orientation exhibiting an acoustic response spectrum at an upper region of the arc tube, the acoustic response spectrum including a frequency region at which a first longitudinal mode is excited, the acoustic response spectrum having a maximum response at a first frequency, $f_{max}$, a minimum response at a second frequency $f_{min}$, and an inversion point at a third frequency, $f_{inv}$, wherein $f_{max} < f_{inv}$ and $f_{inv}$ is between $f_{max}$ and $f_{min}$, the method comprising:

adding a first longitudinal mode resonance excitation frequency, $f_{exc}$, to the modulated lamp power wherein $f_{inv} - 0.2 * f_{inv} \leq f_{exc} < f_{inv}$.

In another aspect, the method of this invention further includes modulating lamp power with at least one arc-straightening frequency.

These and other objects and advantages of the invention will be apparent to those of skill in the art of the present invention after consideration of the following drawings and description of preferred embodiments.

DESCRIPTION OF PREFERRED EMBODIMENTS

In a preferred embodiment, the present invention is a method of operating a discharge lamp that uses two power frequency components. The first component is a sweep over a range of frequencies whose purpose is to straighten and center the arc in the discharge cavity. The swept frequencies are preferably over or near the second azimuthal (2A) resonance frequency, but there can be a relatively wide range of sweep frequencies for particular types of waveforms. The 2A frequency is between the first azimuthal (1A) and first radial (1R) acoustic mode frequencies. It is noted here that not all arc discharge tubes require arc straightening to stabilize and center the arc. Therefore, while it is preferred to include an arc-straightening frequency component, it is not always necessary.

The second component is an excitation of the first longitudinal (1L) resonance mode, but in a way that is different from the usual way of matching a resonance. Usually, the excitation of a resonance is strongest when the applied frequency matches a resonance peak frequency, falling off as the excitation frequency is detuned to higher or lower frequencies. The "center" frequency corresponds to the peak in resonance. The inventor has found that there are two different responses when the excitation frequency is near but separated from the center of the 1 L resonance response in the acoustic spectrum.

Figure 1:
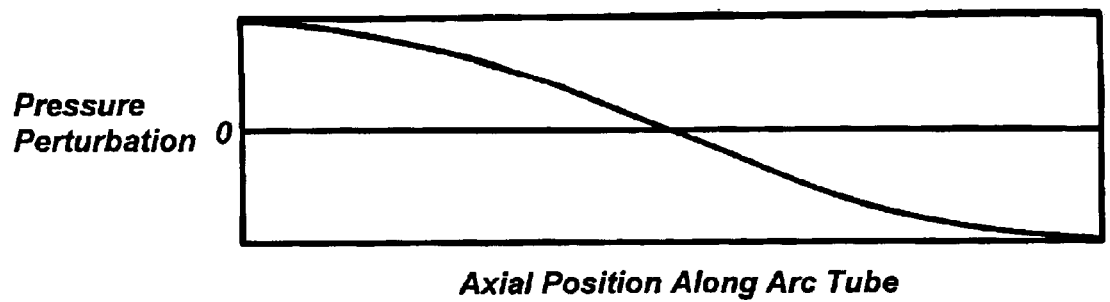
FIG. 1 is a graph depicting an instantaneous standing wave pressure perturbation of the first longitudinal (1L) acoustic mode along the length of a cylindrical cavity.
Figure 2A:
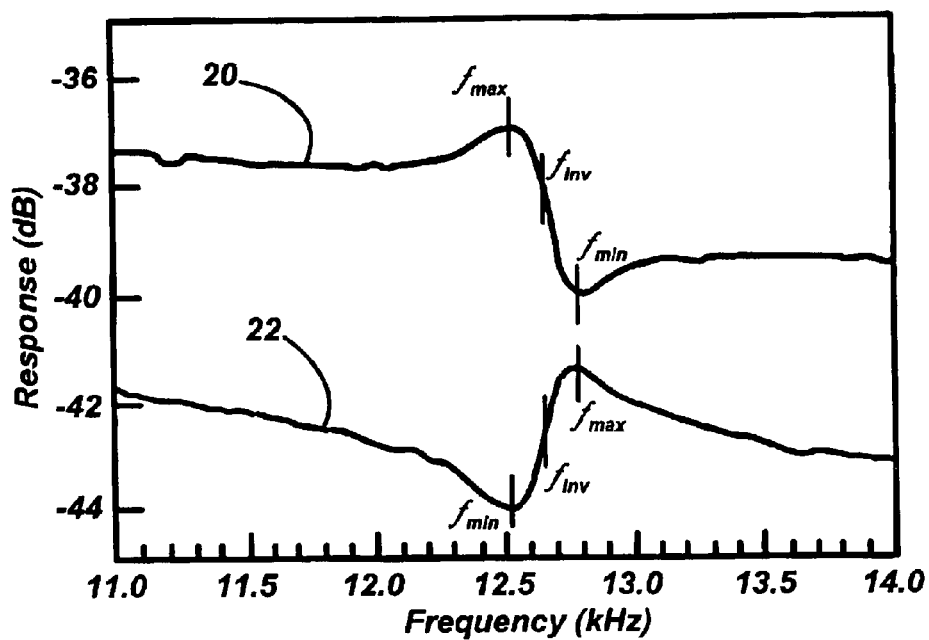
FIG. 2a is a graph of two acoustic response spectra for the 1 L acoustic mode as observed for the two locations shown in FIG. 2b, which is a schematic of an arc discharge tube in a vertical orientation.
Figure 2B:
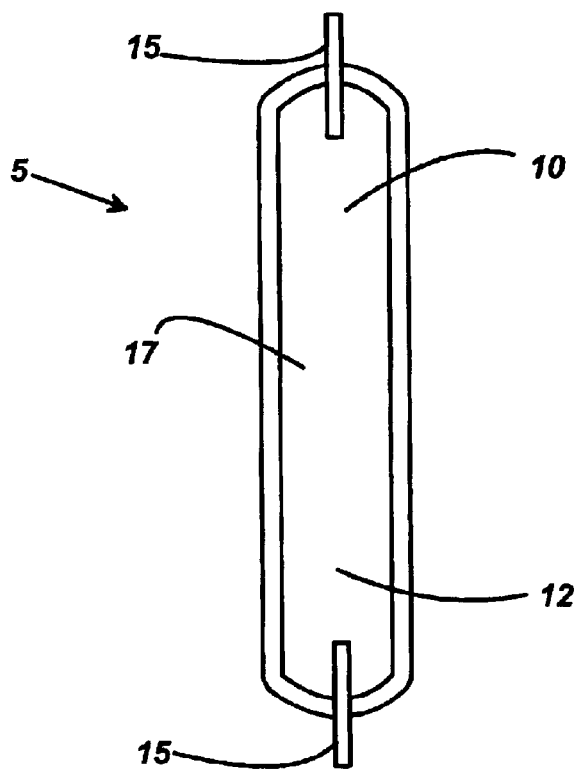

By way of further explanation, and with reference to the first longitudinal (1L) acoustic mode shown in FIG. 1, for a cylindrical cavity with an isothermal temperature distribution, the 1L mode is the lowest frequency resonance mode, with the wavelength of the standing pressure wave being twice the length of the cylinder. The resulting pressure distribution is axially asymmetric, with the perturbation at one end of the arc discharge tube being opposite in sign from the other end. Due to this asymmetry, the 1L mode is not expected to be effectively excited in an arc tube that is axially symmetric with respect to arc position and vapor distribution. However, when the arc tube 5 is operated vertically as illustrated in FIG. 2b, an asymmetric vapor distribution arises in the substantially cylindrical discharge cavity 17 due to segregation. A spatially resolved acoustic resonance spectrum (FIG. 2a) can be obtained by placing a photodiode at the projected image of the operating arc tube, preferably towards ends of the arc tube where the pressure perturbation and consequent light fluctuation are enhanced (observation points 10 and 12 in FIG. 2b). A preferred location to observe the acoustic resonance spectrum is at a point which is approximately one-quarter of the length of the cavity away from an end of the discharge cavity. It is not desirable to observe the response directly at the electrodes 15 because of the "hot spots" which occur at the point of arc attachment. It is also not desirable to observe the response too close to the center (lengthwise) of the arc tube as the amplitude of the response is minimal at the center. Instrumentation that measures the acoustic resonance spectrum of the arc tube is known. (See, e.g., J. Olsen and W. P. Moskowitz, "Optical Measurement of Acoustic Resonance Frequencies in HID Lamps," Proceedings of the IEEE Industrial Applications Society Annual Meeting, New Orleans, La., October 1997) The frequency spectrum of the light output, as detected by a photodiode placed at the image plane of a projection of the arc tube, is normalized by the frequency spectrum of the input power in order to determine the acoustic response of the arc tube. A small amount of noise over an appropriate bandwidth is added to the input power in order to obtain an acoustic response over a desired frequency range. A vector signal analyzer such as the HP89410A (Hewlett-Packard) can be used to facilitate the measurement.

With the arc tube in FIG. 2b oriented vertically and a photodiode positioned to observe an acoustic response at point 10 at an upper region of the arc tube, the input lamp power is modulated with at least one arc-straightening frequency to produce a stable discharge. A flirter frequency component is then added to the modulated lamp power as described above and the acoustic response spectrum is observed. Preferably, the spectrum extends about 2 kHz on either side of the 1L resonance response. More generally, the spectrum includes a frequency range of about ±20% on either side of the 1 L resonance response. At the upper region of the arc tube, acoustic response spectrum is observed as shown in FIG. 2a wherein the 1L resonance response appears centered about a frequency of about 12.6 kHz. The 1L feature in acoustic response spectrum 20 has a maximum response at a first frequency, $f_{max}$, and a minimum response at a second frequency, $f_{min}$, with an inversion occuring at a third frequency, $f_{inv}$, which is between $f_{max}$ and $f_{min}$. In this case, $f_{max}$ and $f_{min}$ are separated by about 300 Hz. As the asymmetry in the arc tube increases over time, $f_{max}$, $f_{min}$, $f_{inv}$, tend to shift to higher frequencies. Moreover, it is important to note that $f_{max}$ occurs at a frequency below $f_{inv}$ and $f_{min}$ occurs at a frequency above $f_{inv}$. The importance of the relative positions of $f_{max}$, $f_{min}$, and $f_{inv}$ will be made clear below.

When the photodiode is positioned at point 12 at a lower region of the arc tube, the observed 1L acoustic response is still centered at about 12.6 kHz however the acoustic response spectrum 22 appears as the inverse of the acoustic response spectrum 20 observed at the upper region. In this case, $f_{max}$ occurs at a frequency which is greater than $f_{inv}$ and $f_{min}$ occurs at a frequency which is less than $f_{inv}$. The position of $f_{inv}$ remains essentially the same and $f_{max}$ and $f_{min}$ are still separated by about 300 Hz.

Figure 3:
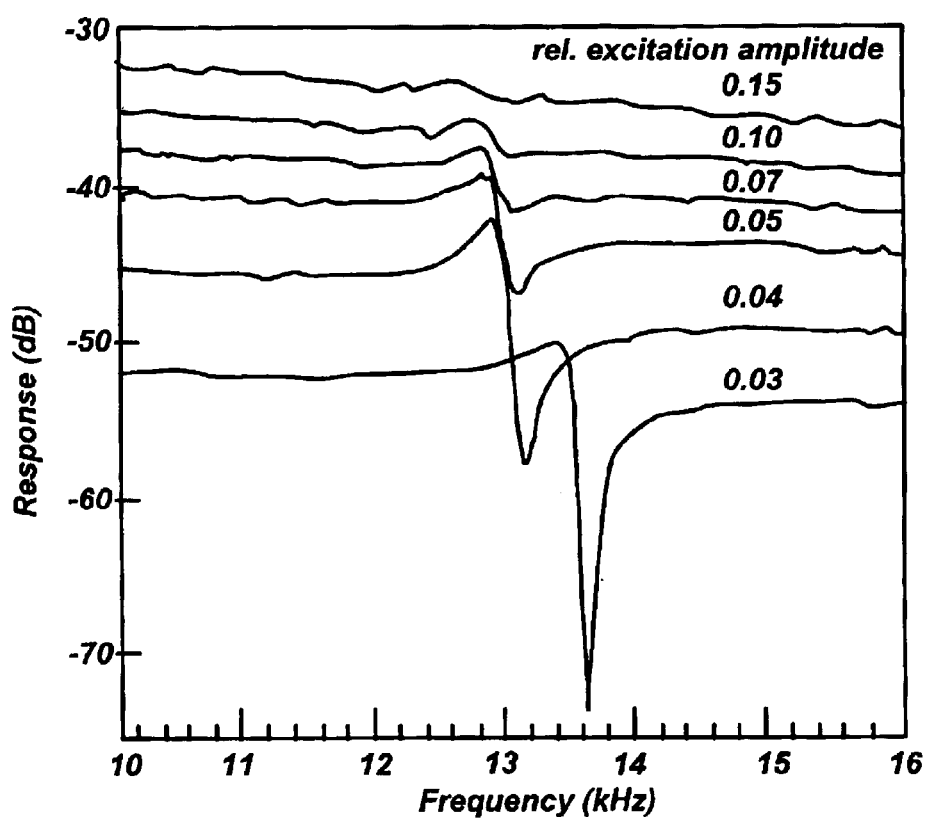
FIG. 3 is a graph of several acoustic response spectra at different modulation amplitudes for the 1 L acoustic mode as observed at the upper region of the discharge tube.

Excitation of the 1 L resonance can induce different directions of flow in the arc tube, and the behavior depends on whether the applied excitation frequency is above or below $f_{inv}$. More importantly, the segregation behavior may be dramatically different depending upon the applied excitation frequency and the relative positions of $f_{max}$, $f_{min}$, and $f_{inv}$ in the arc tube's acoustic response spectrum. In an arc discharge tube whose electrodes extend the same length into the discharge cavity as shown in FIG. 2b, the acoustic response spectrum observed at an upper region of the arc tube, when the arc tube is operated in a vertical orientation, is similar to spectrum 20 in FIG. 2a wherein $f_{max}$ occurs at a frequency below $f_{inv}$ and $f_{min}$ occurs at a frequency above $f_{inv}$. If the 1L excitation frequency is selected to be below $f_{inv}$, e.g., at around 12 kHz, there is an improved mixing of the vapor phase species and decreased segregation, as indicated by reduced color separation of the arc. The 1 L response in the acoustic spectrum also decreases in amplitude as the 1L resonance amplitude is increased, indicating that the lamp is becoming more symmetric (e.g., as shown in FIG. 3). In contrast, if the applied excitation frequency is above $f_{inv}$, e.g., at about 13 kHz, the arc tube tends to segregate further, with extreme color separation of the arc. Segregation increases until $f_{inv}$, which is shifting higher with segregation, becomes equal to the applied excitation frequency. There a stable level of segregation is reached. If the lamp were to segregate further, $f_{inv}$ would be higher than the applied excitation frequency, which would tend to decrease segregation.

With careful selection of the applied excitation frequency, the 1L resonance can be effectively used to reduce segregation in the arc discharge tube. For arc tubes which exhibit at an upper region, when operated vertically, an acoustic response spectrum wherein $f_{max}<f_{inv}$, the applied excitation frequency, $f_{exc}$, should be less than $f_{inv}$. For most arc tubes exhibiting this behavior, the range of useful excitation frequencies will extend about 1–2 kHz below $f_{inv}$, with the optimal effect being obtained when $f_{exc}$ is approximately equal to $f_{max}$. Hence, it is preferred that $f_{inv}-2$ kHz$<f_{exc}<f_{inv}$. More generally, it is preferred that the applied excitation frequency be within 20% of $f_{inv}$, ($f_{inv}-0.2*f_{inv} \leq f_{exc} < f_{inv}$) and even more preferred within 10% of $f_{inv}$, ($f_{inv}-0.1*f_{inv} \leq f_{exc} < f_{inv}$).

Lamp Sample: JA013

The method of this invention was tested on a lamp having the following characteristics.

Arc tube shape: The inner cavity is substantially cylindrical with spherical end bells. The arc tube has an inner length of about 23 mm and a 3.7 mm diameter at the center of the arc tube that tapers slightly towards the ends.

Arc tube contents: 10 mg of a metal halide salt mixture (NaI: $DyI_3$: $HoI_3$: $TmI_3$: TlI in 1:1:1:0.75 molar ratio), 2 bar Xe.

Acoustic response: $f_{max}$ at 12.7 kHz, $f_{inv}$ at 12.85 kHz.

In preparation for the tests, the lamp was first run on a square wave with a 132–145 kHz ripple (for straightening the arc), vertically base up, until most of the salt had accumulated at the bottom (dome) end of the arc tube. In this situation, the tendency of the vapor to mix or segregate is quickly detectable through changes in arc color, without having to wait for the salt to redistribute. A 12 kHz excitation frequency was then added to the ripple, mixing the lamp vapor and reducing the color separation which had begun to appear.

With reference again to FIG. 3, acoustic spectra in the 1 L region were observed at an upper region of the arc tube and were recorded as a function of 12 kHz excitation amplitude (relative amplitude from 0.15 to 0.03), keeping the power constant at 70W by adjusting the square wave amplitude. As the amplitude is decreased, the vapor begins to segregate, the 1L feature in the acoustic spectrum becomes more pronounced, and the lamp voltage also decreases.

Increasing the amplitude restores the lamp to stable vertical operation. This ability to recover from a segregated state is not seen when using some other acoustic resonance modes, which are mainly useful for preventing segregation when applied to a lamp which is not yet segregated. Because the IL mode is asymmetric, it can be readily excited in a segregated lamp whereas axially symmetric modes such as the second and fourth longitudinal modes may not be readily excited.

An amplitude modulation method of selectively applying the IL resonance excitation frequency was also tested successfully on lamp JA013. In this case, a sine wave swept in frequency from 63–71 kHz (126–142 kHz power) was used to power and straighten the arc. The amplitude of the sine wave was then modulated at 12 kHz to allow vertical operation. A modulation index of 0.1 is sufficient for preventing segregation in the short term. A preferred modulation index is from 0.1 to 0.15.

The IL resonance frequency can be applied while starting the lamp in vertical orientation. As the lamp warms up, the 1L mode is "captured" and the lamp eventually reaches a non-segregated state of operation.

Another advantage of using the 1 L resonance frequency is that no salt rings accumulate on the hot cylindrical part of the arc tube. This may help to prevent corrosion of the arc tube wall.

A potential drawback in using these frequencies is that they are low, being within the audible range in the case of some lamps. In shorter lamps, the IL resonance is higher, at about 20 kHz, and using a 1L resonance frequency according to the method of this invention has been successfully used to prevent segregation in these lamps. In addition to reducing the length of the arc tube, another way of increasing the 1 L resonance frequency (and all other frequencies) is to decrease the average molecular mass of the buffer gas. For this reason, fill gas compositions with lighter gases such as argon can be substituted for xenon.

In a preferred embodiment, the 1L excitation frequency, $f_{exc}$, may be a fixed frequency, or a frequency sweep through a range of frequencies within the range dictated by the acoustic response spectrum as explained above. The frequency sweep through the arc-straightening frequency range may be at a sweep rate of 100–1,000 Hz.

As noted above, two power frequency components are used in the present invention. There are generally multiple kinds of voltage waveforms that can produce the desired power frequency components in the operating lamp. The inventor has used the following types of voltage waveforms to get the two power frequency components A and B, where A is the arc-straightening sweep over a range of frequencies and B is the IL resonance excitation frequency, $f_{exc}$: (1) square wave with additive ripple: a low frequency (about 20–500 Hz) switched-DC waveform with a high frequency ripple superimposed, where the ripple is obtained by adding two sine waves with frequencies A and B; (2) square wave with sequential ripple: a low frequency (about 20–500 Hz) switched-DC waveform with a high frequency ripple superimposed, where the ripple is a sine wave which alternates between frequency A and frequency B; and (3) amplitude modulation (AM): a sine wave at frequency (A/2) is amplitude modulated at frequency B. Other possibilities are (4) direct drive sequential: a sine wave in which the frequency alternates between (A/2) and (B/2); (5) direct drive additive: a sum of two sine waves at frequencies (A/2) and (B/2); (6) other periodic waves besides sine waves; and (7) additive or amplitude modulated waveforms in which the interference bands are used (for example, when two frequencies C and D are combined, there are often power components at C+D, C−D, 2C+D, 2C−D, etc.).

By way of example, and with reference to Tables 1–3 below, the inventor has operated different lamp types using waveform type (2) above. Segregation was reduced during vertical operation. The frequency of the switched-DC (square wave) voltage waveform was 400 Hz. The sweep rate for frequency A was 1 kHz. The gate times indicate the time spent at each frequency as the frequency alternates between A and B.

Lamp ID: JH062

Arc tube shape: The inner cavity is approximately cylindrical with spherical end bells. The arc tube has an inner length of about 23 mm and a 3.7 mm diameter at the enter that tapers slightly towards the ends.

Arc tube contents: 1.8 mg NaI, 0.77 mg CeI3, 1.8 mg DyI$_3$, 0.89 mg CaI$_2$, 0.21 mg TlI, 2 bar Xe.

Electrical: At 65 W, voltage is about 54 V and current is about 1.2 A.

Acoustic response: $f_{max}$ at 12.95 kHz, $f_{inv}$ at 13.15 kHz.

Some parameters that worked are given in Table below:

TABLE 1

| Freq A | Gate A | Ampl A | Freq B | Gate B | Ampl B |
|---|---|---|---|---|---|
| 130–150 kHz | 1.8 ms | 30 vpp | 12.9 kHz | 0.7 ms | 50 vpp |
| 130–150 kHz | 1.5 ms | 30 vpp | 12.9 kHz | 1.0 ms | 33 vpp |
| 130–150 kHz | 1.3 ms | 30 vpp | 12.9 kHz | 1.2 ms | 30 vpp |
| 130–150 kHz | 1.0 ms | 30 vpp | 12.9 kHz | 1.5 ms | 24 vpp |
| 130–150 kHz | 0.5 ms | 30 vpp | 12.9 kHz | 2.5 ms | 20 vpp |
| 130–150 kHz | 1.5 ms | 30 vpp | 12.7 kHz | 1.0 ms | 30 vpp |
| 130–150 kHz | 1.5 ms | 30 vpp | 12.2 kHz | 1.0 ms | 32 vpp |
| 130–150 kHz | 1.5 ms | 30 vpp | 11.7 kHz | 1.0 ms | 37 vpp |
| 130–150 kHz | 1.5 ms | 30 vpp | 11.2 kHz | 1.0 ms | 39 vpp |

Lamp ID: LA007

Arc tube shape: Approximately cylindrical with spherical ends; 5.2 mm inner diameter at the center that tapers slightly towards ends; and inner length about 30.5 mm.

Arc tube contents: 15 mg of a metal halide salt mixture (NaI: DyI$_3$: HoI$_3$: TmI$_3$: TlI in a 6:1:1:1:0.75 molar ratio), 1 bar Xe.

Electrical: Lamp voltage was 90–95 V.

Acoustic response: $f_{inv}$ estimated at 8.9 kHz.

Some parameters that worked are given in Table 2:

TABLE 2

| Freq A | Gate A | Ampl A | Freq B | Gate B | Ampl B |
|---|---|---|---|---|---|
| 85–100 kHz | 1.5 ms | 70 vpp | 8.8 kHz | 1.0 ms | 70 vpp |

Lamp ID: CA1

Arc tube shape: Cylindrical; 3.2 mm i.d.; and 22.4 mm inner length.

Arc tube contents: 3 mg of a metal halide salt mixture (NaI: DyI$_3$: HoI$_3$: TmI$_3$: TlI in a 6:1:1:1:0.75 molar ratio), 2 bar Xe.

Electrical: At 50 W, voltage is about 40 V and current is about 1.25 A.

Acoustic response: $f_{max}$ at 13–14 kHz, $f_{inv}$ at 14.4–14.6 kHz.

Some parameters that worked are given in Table 3:

TABLE 3

| Freq A | Gate A | Ampl A | Freq B | Gate B | Ampl B |
|---|---|---|---|---|---|
| 155–175 kHz | 1.5 ms | 27 vpp | 14 kHz | 1.0 ms | 27 vpp |
| 155–175 kHz | 1.5 ms | 27 vpp | 13.4 kHz | 1.0 ms | 30 vpp |
| 155–175 kHz | 1.5 ms | 27 vpp | 12.4 kHz | 1.0 ms | 30 vpp |
| 155–175 kHz | 1.5 ms | 27 vpp | 11.4 kHz | 1.0 ms | 30 vpp |
| 155–175 kHz | 1.5 ms | 27 vpp | 10.4 kHz | 1.0 ms | 35 vpp |
| 155–175 kHz | 1.5 ms | 27 vpp | 9.4 kHz | 1.0 ms | 38 vpp |

While embodiments of the present invention have been described in the foregoing specification and drawings, it is to be understood that the present invention is defined by the following claims when read in light of the specification and drawings.

I claim:

1. A method of operating a discharge lamp, the discharge lamp having an arc discharge tube having a substantially cylindrical inner cavity, the arc discharge tube when operated in a vertical orientation exhibiting an acoustic response spectrum at an upper region of the arc tube, the acoustic response spectrum including a frequency region at which a first longitudinal mode is excited, the acoustic response spectrum having a maximum response at a first frequency, $f_{max}$, a minimum response at a second frequency $f_{min}$, and an inversion point at a third frequency, $f_{inv}$, wherein $f_{max} < f_{inv}$ and $f_{inv}$ is between $f_{max}$ and $f_{min}$, the method comprising:

adding a first longitudinal mode resonance excitation frequency, $f_{exc}$, to the modulated lamp power wherein $f_{inv} - 0.2 * f_{inv} \leq f_{exc} < f_{inv}$.

2. The method of claim 1, wherein $f_{inv} - 0.1 * f_{inv} \leq f_{exc} < f_{inv}$.

3. The method of claim 1, wherein $f_{inv} - 2$ kHz $\leq f_{exc} < f_{inv}$.

4. The method of claim 1, wherein the first longitudinal mode frequency is added by modulating an amplitude of an input sine wave voltage powering the lamp.

5. The method of claim 4, wherein the amplitude modulation has a modulation index of 0.1 to 0.15.

6. The method of claim 1, wherein the first longitudinal mode frequency is added by superimposing the first longitudinal mode frequency on a switched-DC carrier input for the lamp.

7. The method of claim 1, wherein the first longitudinal mode frequency is a fixed frequency.

8. The method of claim 1, wherein the first longitudinal mode frequency is a frequency sweep through a range of frequencies.

9. The method of claim 1, wherein the $f_{exc}$ is approximately equal to $f_{max}$.

10. A method of operating a discharge lamp, the discharge lamp having an arc discharge tube having a substantially cylindrical inner cavity, the arc discharge tube when operated in a vertical orientation exhibiting an acoustic response spectrum at an upper region of the arc tube, the acoustic response spectrum including a frequency region at which a first longitudinal mode is excited, the acoustic response spectrum having a maximum response at a first frequency, $f_{max}$, a minimum response at a second frequency $f_{min}$, and an inversion point at a third frequency, $f_{inv}$, wherein $f_{max} < f_{inv}$, and $f_{inv}$ is between $f_{max}$ and $f_{min}$, the method comprising the steps of:

modulating lamp power with at least one arc-straightening frequency; and adding a first longitudinal mode resonance excitation frequency, $f_{exc}$, to the modulated lamp power wherein $f_{inv} - 0.2 * f_{inv} \leq f_{exc} < f_{inv}$.

11. The method of claim 10, wherein $f_{inv} - 0.1 * f_{inv} \leq f_{exc} < f_{inv}$.

12. The method of claim 10, wherein $f_{inv} - 2 \text{ kHz} \leq f_{exc} < f_{inv}$.

13. The method of claim 10, wherein the first longitudinal mode frequency is added by modulating an amplitude of an input sine wave voltage powering the lamp.

14. The method of claim 13, wherein the amplitude modulation has a modulation index of 0.1 to 0.15.

15. The method of claim 10, wherein the first longitudinal mode frequency is added by superimposing the first longitudinal mode frequency on a switched-DC carrier input for the lamp.

16. The method of claim 10, wherein the at least one arc-straightening frequency is a frequency sweep through the arc-straightening frequency range.

17. The method of claim 16, wherein the frequency sweep is at a sweep rate of 100–1,000 Hz.

18. The method of claim 10, wherein the at least one arc-straightening frequency is approximately a second azimuthal mode frequency.

19. The method of claim 10, wherein the first longitudinal mode frequency is a fixed frequency.

20. The method of claim 10, wherein the first longitudinal mode frequency is a frequency sweep through a range of frequencies.

21. The method of claim 10, wherein the $f_{exc}$ is approximately equal to $f_{max}$.

* * * * *